Aug. 24, 1937. R. H. ZINKIL Re. 20,488

SHOWER HEAD

Original Filed April 29, 1935

Inventor:
Roy H. Zinkil:
By: Joseph O. Lange
Atty.

Reissued Aug. 24, 1937

Re. 20,488

UNITED STATES PATENT OFFICE 20,488

SHOWER HEAD

Roy H. Zinkil, Oak Park, Ill., assignor to Crane Co., Chicago, Ill., a corporation of Illinois Original No. 2,069,733, dated February 2, 1937, Serial No. 18,783, April 29, 1935. Application for reissue March 20, 1937, Serial No. 132,126

3 Claims. (Cl. 299—120)

This invention relates to shower heads, and essentially, to a novel form of spray guide especially adapted for service in connection with certain types of shower bath heads, wash sprays and the like.

More particularly, this invention is concerned with a novel shower head spray guide suitable for use with a form of spray device such as that disclosed in U. S. Patent #1,976,062 of October 9, 1934, granted to Miles E. Estep. It relates especially to a spray guide which constitutes an improvement over the type of spray guide illustrated in the aforementioned patent.

Under the provisions of the above mentioned Estep patent, a novel type of shower head is shown in which a principle of water circulation is used which is fundamentally different from that of the previous conventional shower heads. More specifically, the water entering the spray head is initially given a swirling movement in a relatively large interior chamber after which it passes through a restricted throat to supply the necessary liquid velocity. The water then enters a distributing head or spray guide where the stream is intended to be properly formed to obtain the desired spread. However, it has been definitely determined by actual tests that the previous forms of spray guides did not provide for a spray which would be generally acceptable.

Therefore, this invention especially pertains to a spray guide which is suitable for installation with a head embodying the general water distributing principles above described, and in which such spray guide is preferably adjustable axially with respect to the restricted throat so that the spread of the spray is very easily controllable Numerous tests and installations upon actual service have clearly indicated the necessity for providing a spray guide which is simple and positive in its operation, definite in its spread or area, and is capable of being quickly adjusted by the average user.

Likewise, it is also desirable to provide that the spray guide will be capable of functioning with an adequate cleansing supply and using but a relatively small amount of water.

It is therefore an important feature of the device embodying my invention to produce a spray guide which is capable of defining within accurate limits the spread of the spray as it discharges from the head proper, and at the same time to insure a uniform density of spray throughout the area thus established.

Another important object is to provide a substantially oblong-shaped shower delivery with a tapered spray guide to provide the spread desired.

Further objects and advantages will be apparent upon reading the following description, in connection with the drawing, in which—

Fig. 1 is an exterior slightly perspective view of a preferred adaptation of my invention as applied to a shower head of the type above referred to.

Figure 1:
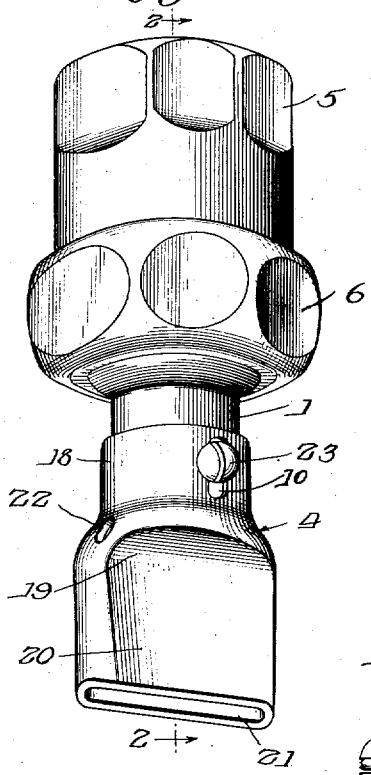
Figure 2:
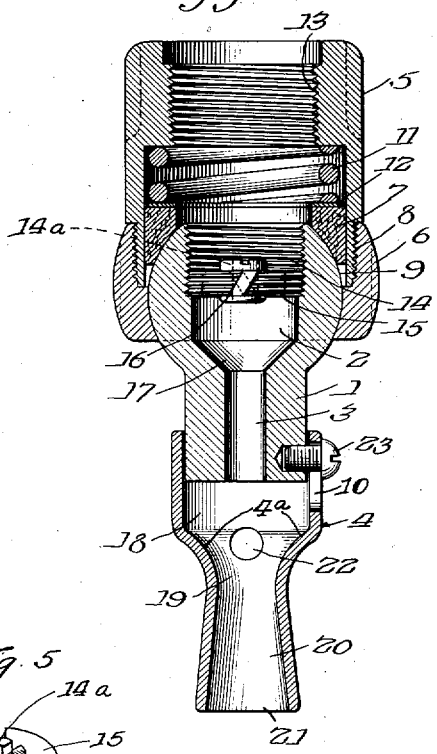
Fig. 2 is a sectional view taken on the line 2—2 of Fig. 1 showing a more detailed application of the spray guide to the shower head.
Figure 5:
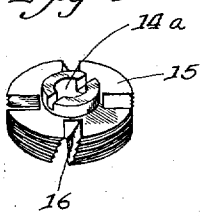
Fig. 5 is a perspective view of the diaphragm.

Describing my invention in more detail and directing attention to Fig. 2, a body or casing 1 is provided having an enlarged inlet chamber 2 at its upper portion, such chamber having at its lower end a restricted throat passage 3 leading into the shower head spray guide 4. The body 1 is preferably attached to the tailpiece 5 by means of the threaded union ring 6 engaging the packing seat 7 by means of the threads 8, the packing being held in a compressed relation against the spherical surface 9 by means of the spring 11 bearing against the washer 12.

The tailpiece 5 is preferably attached to an inlet water supply connection (not shown) by means of the pipe threads 13, the water entering the respective chambers past the spring 11 into the chamber 14 immediately above the diaphragm 15. The latter member is preferably provided with radially arranged inclined slots 16 preferably spaced equidistant apart. The water under its normal flow from the chamber 14 passes into the aforementioned slots 16 and through the central aperture 14a and thus the construction imparts to the water a swirling motion as it passes into the chamber 2 from whence it enters the narrowing space 17 leading into the restricted throat.

Figure 3:
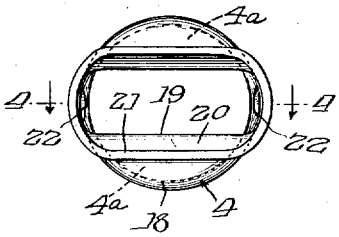
Fig. 3 is an end plan view looking into the discharge opening 21 of Fig. 2.
Figure 4:
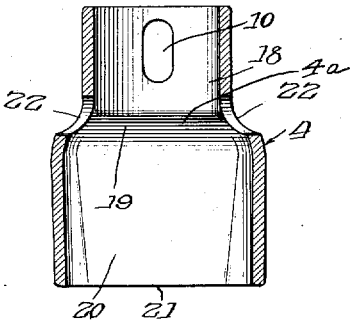
Fig. 4 is a sectional view of the spray guide per se taken on the line 4—4 of Fig. 3.

At this point however, in considering the water travel through the shower head, my improved form of spray guide exercises control over the flowing water which enters the chamber 18 at relatively high velocity. As shown more clearly in Figs. 3 and 4, the narrowed opening 19 of the spray guide 4 assumes an elongated or somewhat flattened form with preferably slightly rounded ends or corners.

The spray guide 4 may, if desired, be made integral with the casing 1 or may be made as indicated as a separate piece and preferably attached to the casing by means of a set screw 23 operating within a slot 10 in order to accomplish such adjustability as may be necessary, or by screw threads and the like, if desired. The adjustment referred to for the axial positioning of the spray guide may be relatively slight and yet accomplish significant changes in the area covered in the spread of the spray. For example, it has been found that an axial movement of the spray guide of only ⅛'' downwardly is sufficient to reduce the spread approximately 20%.

The formation of the throat 19 is preferably obtained by simply flattening the cylindrical portion of the guide and then subsequently allowing the faces which are flattened to flare outward slightly as indicated at 20 in Fig. 2 to the desired width as at 21, and thence discharging into atmosphere. It will be noted by referring to Figs. 3 and 4 that by reason of flattening the cylindrical portion forming the upper part of the spray guide the length of the oblong forming the throat 19 becomes somewhat greater in length than the diameter of the cylindrical portion referred to. Thus, the air vents 22 may be so positioned with respect to the cylindrical portion that they are slightly beyond the diameter of the interior of the cylindrical portion forming the connecting end for the spray guide. This relative arrangement of vent holes is more clearly shown in Fig. 3.

In describing the reception of the high velocity and flowing water into the spray guide, the water by reason of its initial swirling action imparted by the diaphragm slots 16 in conjunction with the central aperture 14*a*, passes downwardly into the restricted throat 3 and over the inclined converging side walls 4*a* formed by the flattening of the cylindrical portion 18 and subsequently converging into the lower portion forming the narrowed opening 19. The water of course continues in its finely broken up and rain-like particles and therefore adapts itself readily to the changed form of interior cross-section continuing between the narrowed opening 19 and the passage 20 into the oblong discharge opening 21.

The water having been broken up into extremely fine particles by reason of its passage through the slots 16 in conjunction with the central aperture 14*a*, continues to remain in such broken up form until it is discharged, which condition is materially aided by the air drawn in and admixed by reason of the vents 22.

It has been found, for example, that if my preferred form of spray guide be removed from the end of the casing 1 the resultant spray is objectionable from a practical standpoint in that it is of a substantially circular cross-section having a slight twisting tendency to throw the particles of water with some high centrifugal force to the outer limits of the circle describing the cross-sectional form of the spray. Such spray has the serious disadvantage of being impractical for use in the conventional shower chambers such as those provided by shower curtains dropping into an ordinary tub or even in the usual relatively restricted shower stall. However, with the installation of my spray guide, the spray produced takes on the form which is sufficiently elongated to readily adapt itself for convenient use by the bather, the body thereof receiving a more thorough spread of the spray. As previously stated, no other previous form of spray guide to my knowledge has been successful in affording such a desirable spray as that above described.

Obviously, the spray guide forming the subject matter of this invention may be used for any form of shower head or spraying device in which the action of the water is maintained at a high velocity and is of initial swirling type. Its application therefore to the construction shown in the Estep patent is merely a preferred form adapted only because of being illustrative of its application.

It is therefore apparent that my invention is capable of several modifications and I desire to be limited only to the extent of the claims appended hereto.

I claim:

1. A shower head of the character described, comprising a spray guide cooperating with a casing having an enlarged inlet chamber and a restricted throat passage in communication with the said spray guide, apertured means within the said inlet chamber for imparting a swirling motion to fluids entering the said inlet chamber, the said spray guide having a vented inlet chamber the lower portion thereof being defined on two sides by oppositely disposed converging walls terminating in an elongated transverse orifice, an axially aligned outlet passage leading from the said orifice defined by a pair of oppositely disposed progressively diverging walls, the ends of the said walls being connected by oppositely disposed longitudinally extending walls substantially parallel to each other and defining the opposite sides of the said passage.

2. A shower head of the character described, comprising a spray guide cooperating with a casing having an enlarged inlet chamber and a restricted throat passage in communication with the said spray guide, apertured means within the said inlet chamber for imparting a swirling motion to fluids entering the said inlet chamber, the said spray guide having a vented inlet chamber the lower portion thereof being defined on two sides by oppositely disposed converging walls terminating in an elongated transverse orifice, an axially aligned outlet passage leading from the said orifice defined by a pair of oppositely disposed progressively diverging walls, the ends of the said walls being connected by oppositely disposed longitudinally extending walls substantially parallel to each other and defining the opposite sides of the said passage, the length of the said elongated orifice defining the maximum distance separating the said end walls.

3. A shower head of the character described, comprising a spray guide cooperating with a casing having an enlarged inlet chamber and a restricted throat passage in communication with the said spray guide, apertured means within the said inlet chamber for imparting a swirling motion to fluids entering the said inlet chamber, the said spray guide having an inlet chamber the lower portion thereof being defined on two sides by oppositely disposed converging walls terminating in an elongated transverse orifice, an axially aligned outlet passage leading from the said orifice defined by a pair of oppositely disposed progressively diverging walls, the ends of the said walls being connected by oppositely disposed longitudinally extending walls substantially parallel to each other and defining the opposite sides of the said passage.

ROY H. ZINKIL.